(12) United States Patent
Takeda

(10) Patent No.: US 10,859,743 B2
(45) Date of Patent: Dec. 8, 2020

(54) POLARIZING ELEMENT, POLARIZING ELEMENT MANUFACTURING METHOD, AND OPTICAL DEVICE

(71) Applicant: Dexerials Corporation, Tokyo (JP)

(72) Inventor: Tomu Takeda, Tokyo (JP)

(73) Assignee: Dexerials Corporation, Tokyo (JP)

( * ) Notice: Subject to any disclaimer, the term of this patent is extended or adjusted under 35 U.S.C. 154(b) by 115 days.

(21) Appl. No.: 16/139,973

(22) Filed: Sep. 24, 2018

(65) Prior Publication Data

US 2019/0094436 A1 Mar. 28, 2019

(30) Foreign Application Priority Data

Sep. 26, 2017 (JP) ................. 2017-185286

(51) Int. Cl.
*G02B 5/30* (2006.01)
*B29D 11/00* (2006.01)

(52) U.S. Cl.
CPC ...... *G02B 5/3058* (2013.01); *B29D 11/00644* (2013.01); *B29D 11/0073* (2013.01)

(58) Field of Classification Search
CPC ............... G02B 5/3058; G02B 27/281; B29D 11/00644; B29D 11/0073
USPC ........................................................ 359/485
See application file for complete search history.

(56) References Cited

U.S. PATENT DOCUMENTS

| | | | | |
|---|---|---|---|---|
| 5,556,667 A | * | 9/1996 | Teranishi ................. | B05D 1/32 427/164 |
| 7,961,393 B2 | | 6/2011 | Perkins et al. | |
| 2008/0186576 A1 | * | 8/2008 | Takada ................. | G02B 5/3025 359/487.03 |
| 2012/0105745 A1 | | 5/2012 | Kumai | |
| 2012/0319222 A1 | | 12/2012 | Ozawa et al. | |
| 2013/0120672 A1 | * | 5/2013 | Kumai ................. | G02F 1/1335 349/5 |
| 2013/0215507 A1 | * | 8/2013 | Sasaki ................. | G02B 5/3058 359/485.05 |

(Continued)

FOREIGN PATENT DOCUMENTS

| | | |
|---|---|---|
| JP | 2003-519818 A | 6/2003 |
| JP | 2008-299178 A | 12/2008 |

(Continued)

OTHER PUBLICATIONS

Notice of Reasons for Rejection issued in the counterpart Japanese Patent Application No. 2017-185286, dated Jun. 5, 2018 (3 Pages).

(Continued)

*Primary Examiner* — Wen Huang

(74) *Attorney, Agent, or Firm* — Osha Bergman Watanabe & Burton LLP

(57) ABSTRACT

Provided is a polarizing element having a wire grid structure, including: a transparent substrate; and grid-shaped convex portions arranged on the transparent substrate at a pitch shorter than a wavelength of light in a use band and extending in a predetermined direction, wherein the grid-shaped convex portion includes a first absorption layer, a first dielectric layer, a reflection layer, a second dielectric layer, and a second absorption layer in order from the transparent substrate side. Further, an optical device including the polarizing plate is provided.

15 Claims, 7 Drawing Sheets

(56) References Cited

U.S. PATENT DOCUMENTS

| | | | |
|---|---|---|---|
| 2013/0215508 A1* | 8/2013 | Sasaki | G02B 5/3058 |
| | | | 359/488.01 |
| 2013/0250412 A1 | 9/2013 | Aota | |
| 2014/0063467 A1 | 3/2014 | Takahashi et al. | |
| 2016/0054497 A1 | 2/2016 | Takahashi | |
| 2016/0131810 A1 | 5/2016 | Takada et al. | |
| 2016/0185119 A1* | 6/2016 | Uchiyama | B41J 2/14233 |
| | | | 428/447 |
| 2016/0291227 A1* | 10/2016 | Nielson | G02B 5/3058 |
| 2018/0081103 A1 | 3/2018 | Takeda | |

FOREIGN PATENT DOCUMENTS

| | | |
|---|---|---|
| JP | 2010-145854 A | 7/2010 |
| JP | 2011-133912 A | 7/2011 |
| JP | 2012-080065 A | 4/2012 |
| JP | 2012-098469 A | 5/2012 |
| JP | 5184624 B2 | 4/2013 |
| JP | 2013-200339 A | 10/2013 |
| JP | 2014-052439 A | 3/2014 |
| JP | 2015-034985 A | 2/2015 |
| JP | 2016-045345 A | 4/2016 |
| JP | 5960319 B1 | 8/2016 |
| JP | 2016-212156 A | 12/2016 |
| JP | 2017-102137 A | 6/2017 |
| WO | 2017/073044 A1 | 5/2017 |

OTHER PUBLICATIONS

Decision of Rejection issued in the counterpart Japanese Patent Application No. 2017-185286, dated Feb. 13, 2018 (3 Pages).
Notice of Reasons for Rejection issued in counterpart Japanese Patent Application No. 2017-185286, dated Nov. 7, 2017 (4 pages).

* cited by examiner

POLARIZING ELEMENT, POLARIZING ELEMENT MANUFACTURING METHOD, AND OPTICAL DEVICE

This application is based on and claims the benefit of priority from Japanese Patent Application No. 2017-185286, filed on 26 Sep. 2017, the content of which is incorporated herein by reference.

BACKGROUND OF THE INVENTION

Field of the Invention

The present invention relates to a polarizing element, a polarizing element manufacturing method, and an optical device.

Related Art

A polarizing element is an optical element that absorbs polarized light in one direction and transmits polarized light in a direction orthogonal to the one direction. In a liquid crystal display device, a polarizing element is necessary in principle. Particularly, in a liquid crystal display device using a light source with a large light amount such as a transmissive liquid crystal projector, the polarizing element receives strong radiation. For this reason, a size of about several centimeters and a high extinction ratio are required in addition to excellent heat resistance. In order to cope with such a demand, a wire grid type inorganic polarizing element has been proposed.

A wire grid type polarizing element has a structure in which a plurality of conductor wires (reflection layers) extending in one direction are arranged on a transparent substrate at a pitch (several tens of nm to several hundreds of nm) shorter than a wavelength of light in a use band. When light is incident to the polarizing element, polarized light (TE wave (S wave)) parallel to the wire extension direction cannot be transmitted and polarized light (TM wave (P wave)) perpendicular to the wire extension direction is directly transmitted. Since the wire grid type polarizing element has excellent heat resistance, can manufacture a relatively large element, and has a high extinction ratio, the polarizing element is suitable for an application such as a liquid crystal projector.

So far, polarizing elements having various structures have been proposed as the wire grid type polarizing element.

For example, Patent Document 1 discloses a polarizing element including a base body and grid-shaped convex portions arranged on the base body at a pitch shorter than a wavelength of light in a use band, and the grid-shaped convex portion includes a wire grid layer, a dielectric layer, an absorption layer, and a dielectric layer in order from the base body side. Further, Patent Document 2 discloses a polarizing element including a transparent substrate and grid-shaped convex portions arranged on the transparent substrate at a pitch shorter than a wavelength of light in a use band, and the grid-shaped convex portion includes a reflection layer, a dielectric layer, and an absorption layer in order from the transparent substrate side.

Patent Document 1: Japanese Patent No. 5184624
Patent Document 2: Japanese Patent No. 5960319

SUMMARY OF THE INVENTION

Incidentally, when the wire grid type polarizing element is used in the liquid crystal projector, the grid surface provided with the grid-shaped convex portion is normally disposed toward a liquid crystal panel. Thus, in the polarizing element disposed on the light emission side of the liquid crystal panel, light is incident from the grid surface side provided with the grid-shaped convex portion. According to the conventional polarizing element disclosed in Patent Documents 1 and 2, it is possible to suppress the absorption axis reflectance to be low for the light incident from the grid surface side provided with the grid-shaped convex portion.

However, in the liquid crystal projector, there is a case in which the light transmitted through the polarizing element on the light emission side is reflected by the other optical elements or the like and is incident to the polarizing element as returned light. In this case, in the conventional polarizing element disclosed in Patent Documents 1 and 2, the absorption axis reflectance cannot be suppressed to be low and reflection occurs at a high ratio. If such reflection of returned light is repeated, image quality may be deteriorated due to ghost or the like.

The invention has been made in view of the above-described circumstances and an object thereof is to provide a polarizing element capable of suppressing an absorption axis reflectance to be low for both of light incident from a grid surface side provided with a grid-shaped convex portion and light incident from a substrate surface side, a polarizing element manufacturing method, and an optical device including the polarizing element.

In order to attain the above-described object, the invention provides a polarizing element (for example, a polarizing element 1 to be described later) having a wire grid structure, including: a transparent substrate (for example, a transparent substrate 10 to be described later); and grid-shaped convex portions (for example, grid-shaped convex portions 11 to be described later) arranged on the transparent substrate at a pitch shorter than a wavelength of light in a use band and extending in a predetermined direction, in which each grid-shaped convex portion includes a first absorption layer (for example, a first absorption layer 13 to be described later), a first dielectric layer (for example, a first dielectric layer 14 to be described later), a reflection layer (for example, a reflection layer 15 to be described later), a second dielectric layer (for example, a second dielectric layer 16 to be described later), and a second absorption layer (for example, a second absorption layer 17 to be described later) in order from the transparent substrate side.

The grid-shaped convex portion may include a base (for example, a base 12 to be described later) between the transparent substrate and the first absorption layer and the base may have a trapezoidal shape as viewed from the predetermined direction.

The base may be formed of Si oxide which is transparent to the wavelength of the light in the use band.

The first absorption layer and the second absorption layer may be formed of the same material.

The first dielectric layer and the second dielectric layer may be formed of the same material.

A film thickness of the first absorption layer may be substantially the same as a film thickness of the second absorption layer and a film thickness of the first dielectric layer may be substantially the same as a film thickness of the second dielectric layer.

The transparent substrate may be transparent to the wavelength of the light in the use band and may be formed of glass, quartz, or sapphire.

The reflection layer may be formed of aluminum or an aluminum alloy.

The first dielectric layer and the second dielectric layer may be formed of Si oxide.

The first absorption layer and the second absorption layer may include Fe and Ta and may further include Si.

A surface on the side of the grid-shaped convex portion of the polarizing element may be covered with a protection film formed of a dielectric material.

A surface on the side of the grid-shaped convex portion of the polarizing element may be covered with an organic water repellent film.

A grid tip (for example, a grid tip 19 to be described later) formed at a tip of the grid-shaped convex portion may have a taper shape of which a side surface is inclined so that a width is narrowed toward the tip as viewed from the predetermined direction.

The reflection layer may include a metal layer (for example, a metal layer 151 to be described later) and an oxide layer (for example, an oxide layer 152 to be described later) formed of metal oxide forming the metal layer and covering a side surface of the metal layer as viewed from the predetermined direction.

A width of the reflection layer may be smaller than those of the first dielectric layer and the second dielectric layer.

Further, the invention provides a method of manufacturing a polarizing element having a wire grid structure, including: forming a lamination structure including a first absorption layer, a first dielectric layer, a reflection layer, a second dielectric layer, and a second absorption layer in this order from the transparent substrate side on the transparent substrate; and forming grid-shaped convex portions arranged on the transparent substrate at a pitch shorter than a wavelength of light in a use band by selectively etching the lamination structure.

Further, the invention provides an optical device including the polarizing element.

According to the invention, it is possible to provide a polarizing element capable of suppressing an absorption axis reflectance to be low for both of light incident from a grid surface side provided with a grid-shaped convex portion and light incident from a substrate surface side, a polarizing element manufacturing method, and an optical device including the polarizing element.

DETAILED DESCRIPTION OF THE INVENTION

Hereinafter, an embodiment of the invention will be described in detail with reference to the drawings.

[Polarizing Element]

A polarizing element according to the embodiment is a polarizing element having a wire grid structure, including: a transparent substrate and grid-shaped convex portions arranged on the transparent substrate at a pitch (period) shorter than a wavelength of light in a use band and extending in a predetermined direction. Further, each grid-shaped convex portion includes a first absorption layer, a first dielectric layer, a reflection layer, a second dielectric layer, and a second absorption layer in order from the transparent substrate side.

Figure 1:
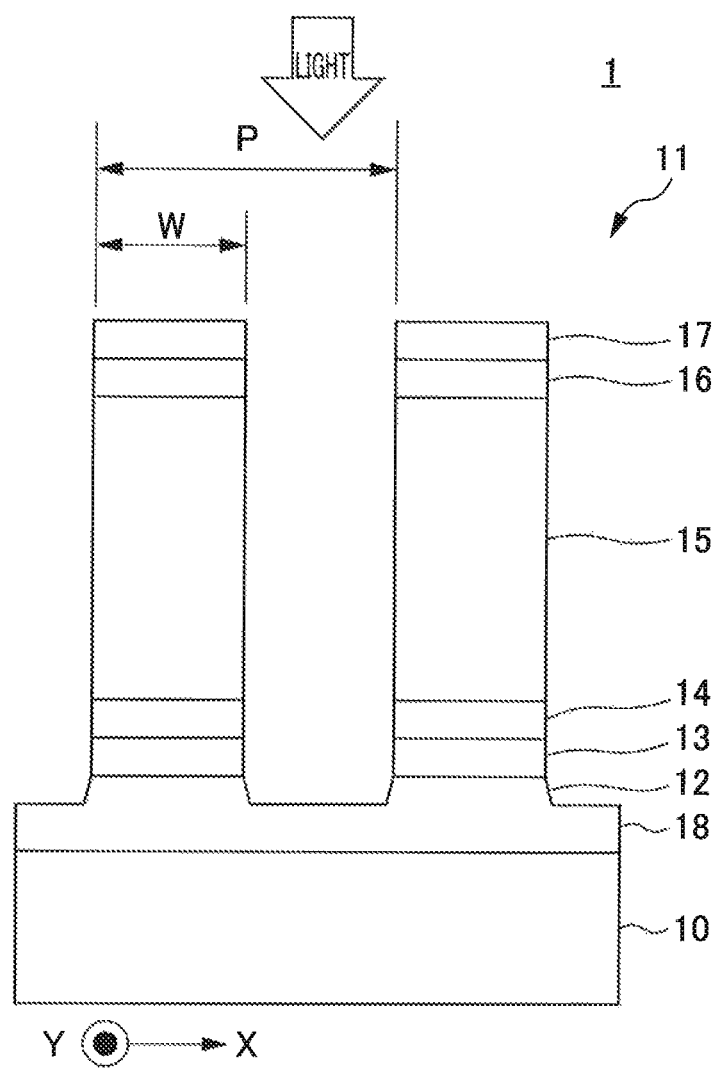
FIG. 1 is a schematic cross-sectional view illustrating an example of an optical element according to the embodiment.

FIG. 1 is a schematic cross-sectional view illustrating an example of a polarizing element 1 according to the embodiment. As illustrated in FIG. 1, the polarizing element 1 includes a transparent substrate 10 which is transparent to the light in the use band and grid-shaped convex portions 11 which are arranged on one surface of the transparent substrate 10 at a pitch P shorter than the wavelength of the light in the use band. Each grid-shaped convex portion 11 includes a base 12 formed as necessary, a first absorption layer 13, a first dielectric layer 14, a reflection layer 15, a second dielectric layer 16, and a second absorption layer 17 in order from the side of the transparent substrate 10. That is, the polarizing element 1 illustrated in FIG. 1 has a wire grid structure in which the grid-shaped convex portions 11 formed by stacking the base 12, the first absorption layer 13, the first dielectric layer 14, the reflection layer 15, the second dielectric layer 16, and the second absorption layer 17 in order from the side of the transparent substrate 10 are arranged on the transparent substrate 10 in a one-dimensional lattice shape.

In the specification, as illustrated in FIG. 1, the extension direction (a predetermined direction) of the grid-shaped convex portion 11 will be referred to as the Y-axis direction. Further, a direction which is orthogonal to the Y-axis direction and in which the grid-shaped convex portions 11 are arranged along the main surface of the transparent substrate 10 will be referred to as the X-axis direction. In this case, the light incident to the polarizing element 1 is desirably incident from a direction orthogonal to the X-axis direction and the Y-axis direction at the side (the grid surface side) provided with the grid-shaped convex portion 11 of the transparent substrate 10.

By using four actions of transmission, reflection, interference, and selective light absorption of polarization waves due to optical anisotropy, the polarizing element 1 attenuates polarized light having an electric field component parallel to the Y-axis direction (TE wave (S wave)) and transmits polarized light (TM wave (P wave)) having an electric field component parallel to the X-axis direction. Thus, the Y-axis direction is the direction of the absorption axis of the polarizing element 1 and the X-axis direction is the direction of the transmission axis of the polarizing element 1.

The light incident from the side (the grid surface side) provided with the grid-shaped convex portion 11 of the polarizing element 1 is attenuated while a part of the light is absorbed when the light passes through the second absorption layer 17 and the second dielectric layer 16. Among the light transmitted through the second absorption layer 17 and the second dielectric layer 16, the TM wave (P wave) is transmitted through the reflection layer 15, the first dielectric layer 14, and the first absorption layer 13 at a high transmittance. Meanwhile, among the light transmitted through the second absorption layer 17 and the second dielectric layer 16, the TE wave (S wave) is reflected by the reflection layer 15. When the TE wave which is reflected by the reflection layer 15 passes through the second dielectric layer 16 and the second absorption layer 17, a part of the wave is absorbed and a part of the wave is reflected and returned to the reflection layer 15. Further, the TE wave reflected by the reflection layer 15 is attenuated by interference at the time of passing through the second dielectric layer 16 and the second absorption layer 17.

Meanwhile, the light incident from the side of the transparent substrate 10 (the substrate surface side) of the polarizing element 1 is attenuated while a part of the light is absorbed when the light passes through the first absorption layer 13 and the first dielectric layer 14. Among the light transmitted through the first absorption layer 13 and the first dielectric layer 14, TM wave (P wave) is transmitted through the reflection layer 15, the second dielectric layer 16, and the second absorption layer 17 at a high transmittance. Meanwhile, among the light transmitted through the first absorption layer 13 and the first dielectric layer 14, TE wave (S wave) is reflected by the reflection layer 15. When the TE wave reflected by the reflection layer 15 passes through the first dielectric layer 14 and the first absorption layer 13, a part of the wave is absorbed and a part of the wave is reflected and returned to the reflection layer 15. Further, the TE wave reflected by the reflection layer 15 is attenuated by interference at the time of passing through the first dielectric layer 14 and the first absorption layer 13.

As described above, in the polarizing element 1 according to the embodiment, it is possible to suppress the absorption axis reflectance to be low for both of the light incident from the grid surface side provided with the grid-shaped convex portion and the light incident from the substrate surface side.

The transparent substrate 10 is not particularly limited as long as the transparent substrate 10 is a substrate exhibiting translucency to the light in the use band and can be appropriately selected in accordance with the purpose. The phrase "exhibiting translucency to the light in the use band" does not denote that the transmittance of the light in the use band is 100%, and the phrase may denote that the transparent substrate may exhibit translucency capable of retaining a function as a polarizing element. As the light in the use band, for example, visible light having a wavelength of about 380 nm to 810 nm can be exemplified.

The shape of the main surface of the transparent substrate 10 is not particularly limited and a shape (for example, a rectangular shape) according to a purpose is appropriately selected. The average thickness of the transparent substrate 10 is desirably, for example, 0.3 mm to 1 mm.

As the material constituting the transparent substrate 10, a material having a refractive index of 1.1 to 2.2 is desirable and glass, quartz, sapphire, and the like can be exemplified. From the viewpoint of cost and light transmittance, it is desirable to use glass, particularly, quartz glass (having a refractive index of 1.46) or soda lime glass (having a refractive index of 1.51). The composition of the element of the glass material is not particularly limited and, for example, an inexpensive glass material such as silicate glass widely distributed as an optical glass can be used.

Further, from the viewpoint of thermal conductivity, it is desirable to use quartz or sapphire having high thermal conductivity. Accordingly, since high light fastness with respect to strong light is obtained, it is desirably used as a polarizing element for an optical engine of a projector with a large heat generation amount.

Additionally, when a transparent substrate formed of optically active crystals such as quartz is used, it is desirable to arrange the grid-shaped convex portion 11 in a direction parallel or perpendicular to the optical axis of the crystal. Accordingly, excellent optical characteristics can be obtained. Here, the optical axis indicates a direction axis in which a difference in refractive index between the light O (normal light) traveling in that direction and the light E (ideal light) becomes minimal.

The grid-shaped convex portions 11 are arranged on the transparent substrate at a pitch P shorter than the wavelength of the light in the use band. There is no particular limitation as long as the pitch P of the grid-shaped convex portion 11 is shorter than the wavelength of the light in the use band. From the viewpoint of ease of production and stability, the pitch P of the grid-shaped convex portions 11 is desirably, for example, 100 nm to 200 nm. The pitch P of the grid-shaped convex portion 11 can be measured by the observation using a scanning electron microscope or a transmission electron microscope. For example, the pitches of four arbitrary positions are measured by using the scanning electron microscope or the transmission electron microscope and an arithmetic average value thereof can be set to the pitch of the grid-shaped convex portions 11. Hereinafter, this measurement method will be referred to as an electron microscopy method.

The width W of the grid-shaped convex portion 11 is not particularly limited, but is desirably smaller than the width of the concave portion between the grid-shaped convex portions 11. Specifically, the width W of the grid-shaped convex portion 11 is desirably, for example, 35 nm to 45 nm. The width W of the grid-shaped convex portion 11 can be measured by the above-described electron microscopy method at the center position of the height of the grid-shaped convex portion 11.

The base 12 has a trapezoidal shape as viewed from the extension direction of the grid-shaped convex portion 11 (a predetermined direction), that is, as viewed from a cross-section orthogonal to the predetermined direction as illustrated in FIG. 1. More specifically, the base 12 has an isosceles trapezoidal shape in which the side surface is inclined so that the width decreases from the side of the transparent substrate 10 toward the side of the first absorption layer 13 as viewed from a predetermined direction.

The film thickness of the base 12 is not particularly limited and is desirably, for example, 10 nm to 100 nm. Additionally, the film thickness of the base 12 can be measured by, for example, the above-described electron microscopy method.

The base 12 has a configuration in which the dielectric film extending in a band shape in the Y-axis direction corresponding to the absorption axis is arranged on the transparent substrate 10. As the material forming the base 12, a material which is transparent to the light in the use band and has a refractive index smaller than that of the transparent substrate 10 is desirable and particularly, Si oxide such as $SiO_2$ is desirable.

The base 12 can be formed by gradually changing a balance between isotropic etching and anisotropic etching by dry etching with respect to the underlying layer 18 made of the above-described dielectric and formed on the transparent substrate 10. In this case, as illustrated in FIG. 1, the base 12 is disposed on the underlying layer 18 formed on the transparent substrate 10. Since the base 12 is formed in a trapezoidal shape, it is considered that the same effect as that of the moth eye structure of which the refractive index gently changes can be obtained, the reflection of light can be prevented, and the high transmittance characteristics can be obtained.

Here, as described above, in the embodiment, the base 12 is not an essential configuration and the polarizing element 1 may not include the base 12. In this case, the grid-shaped convex portions 11 can be directly arranged on the underlying layer 18.

The first absorption layer 13 is formed on the base 12 and is arranged to extend in a band shape in the Y-axis direction corresponding to the absorption axis. As the material forming the first absorption layer 13, one or more materials (a metal material, a semiconductor material, and the like) having a light absorbing function in which the extinction constant of the optical constant is not zero can be exemplified, and the material is appropriately selected depending on the wavelength range of light to be applied. As the metal material, an element such as Ta, Al, Ag, Cu, Au, Mo, Cr, Ti, W, Ni, Fe, and Sn or an alloy including at least one element thereof can be exemplified. Further, as the semiconductor material, Si, Ge, Te, ZnO, silicide materials ($\beta$-$FeSi_2$, $MgSi_2$, $NiSi_2$, $BaSi_2$, $CrSi_2$, $CoSi_2$, TaSi, and the like) can be exemplified. When these materials are used, the polarizing element 1 can have a high extinction ratio with respect to the visible light range to be applied. Among these, the first absorption layer 13 desirably includes Fe or Ta and further includes Si.

When the semiconductor material is used as the first absorption layer 13, since the band gap energy of the semiconductor is involved with the absorption function, it is necessary that the band gap energy is equal to or smaller than the use band. For example, in the case of application to the visible light, it is necessary to use a material having absorption at a wavelength of 400 nm or more, that is, a material having a band gap of 3.1 eV or less.

The film thickness of the first absorption layer 13 is not particularly limited and is desirably, for example, 10 nm to 100 nm. The film thickness of the first absorption layer 13 can be measured by, for example, the above-described electron microscopy method. Additionally, the first absorption layer 13 can be formed as a high-density film by vapor deposition, sputtering, or the like. Further, the first absorption layer 13 may include two or more layers having different forming materials.

The first dielectric layer 14 is formed on the first absorption layer 13 and is formed by arranging a dielectric film extending in a band shape in the Y-axis direction corresponding to the absorption axis. The first dielectric layer 14 is formed to have a film thickness which allows the transmission in the first absorption layer 13 with respect to the polarized light incident from the substrate surface side and reflected by the first absorption layer 13 and shifts the phase of the polarized light reflected by the reflection layer 15 by a half wavelength. Specifically, the film thickness of the first dielectric layer 14 is appropriately set in the range of 1 nm to 500 nm capable of improving an interference effect by adjusting the phase of the polarized light. The film thickness of the first dielectric layer 14 can be measured by, for example, the above-described electron microscopy method.

As the material forming the first dielectric layer 14, a general material such as Si oxide such as $SiO_2$, metal oxides such as $Al_2O_3$, beryllium oxide, and bismuth oxide, $MgF_2$, cryolite, germanium, titanium dioxide, silicon, magnesium fluoride, boron nitride, boron oxide, tantalum oxide, carbon, or a combination of these can be exemplified. Among these, the first dielectric layer 14 is desirably formed of Si oxide.

The refractive index of the first dielectric layer 14 is desirably larger than 1.0 and equal to or smaller than 2.5. Since the optical characteristics of the reflection layer 15 are also influenced by the peripheral refractive index, it is possible to control the characteristics of the polarizing element 1 by selecting the material of the first dielectric layer 14. Further, since the film thickness and the refractive index of the first dielectric layer 14 are appropriately adjusted, when the TE wave incident from the substrate surface side and reflected by the reflection layer 15 is transmitted through the first absorption layer 13, a part of the wave can be reflected and returned to the reflection layer 15 and the light passing through the first absorption layer 13 can be attenuated by interference. In this way, since the TE wave is selectively attenuated among the light incident from the substrate surface side, it is possible to obtain desired polarization characteristics.

The reflection layer 15 is formed on the first dielectric layer 14 and is formed by arranging a metal film extending in a band shape in the Y-axis direction corresponding to the absorption axis. The reflection layer 15 has a function as a wire grid type polarizer and is used to attenuate the polarized wave having an electric field component in a direction parallel to the longitudinal direction of the reflection layer 15 (TE wave (S wave)) and transmit the polarized wave having an electric field component in a direction orthogonal to the longitudinal direction of the reflection layer 15 (TM wave (P wave)).

The material forming the reflection layer 15 is not particularly limited as long as the material is reflective to the light in the use band and, for example, an element such as Al, Ag, Cu, Mo, Cr, Ti, Ni, W, Fe, Si, Ge, and Te or an alloy including one or more elements thereof can be exemplified. Among these, the reflection layer 15 is desirably formed of aluminum or an aluminum alloy. Additionally, in addition to these metal materials, the reflection layer 15 may be formed by, for example, an inorganic film or a resin film formed with high surface reflectance due to coloring or the like other than metal.

The film thickness of the reflection layer 15 is not particularly limited and is desirably, for example, 100 nm to 300 nm. Additionally, the film thickness of the reflection layer 15 can be measured by, for example, the above-described electron microscopy method.

The second dielectric layer 16 is formed on the reflection layer 15 and is formed by arranging the dielectric film extending in a band shape in the Y-axis direction corresponding to the absorption axis. The second dielectric layer 16 is formed to have a film thickness which allows the transmission in the second absorption layer 17 with respect to the polarized light incident from the grid surface side and reflected by the second absorption layer 17 and shifts the phase of the polarized light reflected by the reflection layer 15 by a half wavelength. Specifically, the film thickness of the second dielectric layer 16 is appropriately set in the range of 1 nm to 500 nm capable of improving an interference effect by adjusting the phase of the polarized light. The film thickness of the second dielectric layer 16 can be measured by, for example, the above-described electron microscopy method.

As the material forming the second dielectric layer 16, the same material as that of the first dielectric layer 14 can be exemplified. Particularly, the second dielectric layer 16 is desirably formed of the same material as that of the first dielectric layer 14. When the first dielectric layer 14 and the second dielectric layer 16 are formed of the same material, an etching condition and the like at the time of manufacturing can be the same and thus the manufacturing can be facilitated. Further, the performance of the first dielectric layer 14 and the performance of the second dielectric layer 16 can be matched.

The refractive index of the second dielectric layer 16 is desirably larger than 1.0 and is equal to or smaller than 2.5. Since the optical characteristics of the reflection layer 15 are also influenced by the peripheral refractive index, the characteristics of the polarizing element 1 can be controlled by selecting the material of the second dielectric layer 16. Further, since the film thickness and the refractive index of the second dielectric layer 16 are appropriately adjusted, when the TE wave incident from the grid surface side and reflected by the reflection layer 15 is transmitted through the second absorption layer 17, a part of the wave can be reflected and returned to the reflection layer 15 and the light passing through the second absorption layer 17 can be attenuated by interference. In this way, since the TE wave is selectively attenuated among the light incident from the grid surface side, it is possible to obtain desired polarization characteristics.

The second absorption layer 17 is formed on the second dielectric layer 16 and is arranged to extend in a band shape in the Y-axis direction corresponding to the absorption axis. As the material forming the second absorption layer 17, the same material as that of the first absorption layer 13 can be exemplified. Particularly, the second absorption layer 17 is desirably formed of the same material as that of the first absorption layer 13. When the first absorption layer 13 and the second absorption layer 17 are formed of the same material, an etching condition and the like at the time of manufacturing can be the same and thus the manufacturing can be facilitated. Further, the performance of the first absorption layer 13 and the performance of the second absorption layer 17 can be matched.

The film thickness of the second absorption layer 17 is not particularly limited and is desirably, for example, 10 nm to 100 nm. The film thickness of the second absorption layer 17 can be measured by, for example, the above-described electron microscopy method. Additionally, the second absorption layer 17 can be formed as a high-density film by vapor deposition, sputtering, or the like. Further, the second absorption layer 17 may include two or more layers having different forming materials.

Additionally, in the polarizing element 1 according to the embodiment, it is desirable that the film thickness of the first absorption layer 13 be substantially the same as the film thickness of the second absorption layer 17 and the film thickness of the first dielectric layer 14 be substantially the same as the film thickness of the second dielectric layer 16. Specifically, when the film thickness of the first absorption layer 13 is indicated by $t_1$ (nm), the film thickness of the second absorption layer 17 is desirably 0.90 $t_1$ (nm) to 1.10 $t_1$ (nm) and more desirably 0.95 $t_1$ (nm) to 1.05 $t_1$ (nm). Further, when the film thickness of the first dielectric layer 14 is indicated by $t_2$ (nm), the film thickness of the second dielectric layer 16 is desirably 0.90 $t_2$ (nm) to 1.10 $t_2$ (nm) and more desirably 0.95 $t_2$ (nm) to 1.05 $t_2$ (nm). When the film thickness is set to be the same in this way, it is possible to match the wavelength at the minimum point of the absorption axis reflectance for the light incident from the grid surface side and the light incident from the substrate surface side.

The polarizing element 1 according to the embodiment with the above-described configuration may have a diffusion barrier layer at a position between the first absorption layer 13 and the first dielectric layer 14 and at a position between the second dielectric layer 16 and the second absorption layer 17. That is, in this case, the grid-shaped convex portion 11 includes the base 12, the first absorption layer 13, the diffusion barrier layer, the first dielectric layer 14, the reflection layer 15, the second dielectric layer 16, the diffusion barrier layer, and the second absorption layer 17 in order from the side of the transparent substrate 10. When the polarizing element 1 has a diffusion barrier layer, the diffusion of light in the first absorption layer 13 and the second absorption layer 17 can be prevented. The diffusion barrier layer is formed as a metal film of Ta, W, Nb, Ti, or the like.

Further, the polarizing element 1 according to the embodiment may have a configuration in which a surface on the side of a grid surface is covered with a protection film formed of a dielectric material in a range that does not give an influence on a change in the optical characteristics. The protection film is formed as a dielectric film and can be formed by using a CVD method (chemical vapor deposition method), an ALD method (atomic layer deposition method), or the like for the surface on the side of the grid surface. Accordingly, it is possible to suppress an oxidation reaction more than necessary for the metal film.

Further, the polarizing element 1 according to the embodiment may have a configuration in which the surface on the side of the grid surface is covered with an organic water repellent film. The organic water repellent film is formed of a fluorine-based silane compound such as perfluorodecyltriethoxysilane (FDTS) and can be formed by using the above-described CVD method, ALD method, or the like. Accordingly, reliability such as moisture resistance of the polarizing element 1 can be improved.

[Polarizing Element Manufacturing Method]

The polarizing element manufacturing method according to the embodiment is a method of manufacturing a polarizing element having a wire grid structure, including: forming a lamination structure including a first absorption layer, a first dielectric layer, a reflection layer, a second dielectric layer, and a second absorption layer in this order from the transparent substrate side on the transparent substrate; and forming grid-shaped convex portions arranged on the transparent substrate at a pitch shorter than a wavelength of light in a use band by selectively etching the lamination structure.

Hereinafter, as an example, a method of manufacturing the polarizing element 1 illustrated in FIG. 1 will be described.

First, a lamination structure including an underlying layer, a first absorption layer, a first dielectric layer, a reflection layer, a second dielectric layer, and a second absorption layer formed in this order from the side of the transparent substrate 10 is formed on the transparent substrate 10. As a method of forming the layers, a sputtering method, a vapor deposition method, and the like can be exemplified.

Next, one dimensional lattice mask pattern is formed on the second absorption layer by a photolithography method, a nanoimprinting method, and the like. Then, the lamination structure is selectively etched to form the grid-shaped convex portions 11 arranged on the transparent substrate 10 at a pitch shorter than the wavelength of the light in the use band. As the etching method, for example, a dry etching method using an etching gas corresponding to an etching target can be exemplified.

Particularly, when manufacturing the polarizing element 1 illustrated in FIG. 1, the base 12 having a trapezoidal shape as viewed from the extension direction of the grid-shaped convex portion 11 is formed by optimizing an etching condition of the underlying layer. With the above-described configuration, the polarizing element 1 illustrated in FIG. 1 is manufactured.

Additionally, the polarizing element manufacturing method according to the embodiment may further include coating the surface on the side of the grid surface with a protection film. Further, the polarizing element manufacturing method according to the embodiment may further include coating the surface on the side of the grid surface with an organic water repellent film.

[Optical Device]

An optical device according to the embodiment includes the above-described polarizing element according to the embodiment. As the optical device, a liquid crystal projector, a head-up display, a digital camera, and the like can be exemplified. Since the polarizing element according to the embodiment is an inorganic polarizing element having excellent heat resistance compared to an organic polarizing element, the application to the liquid crystal projector, the head-up display, and the like requiring heat resistance is desirable.

When the optical device according to the embodiment includes a plurality of polarizing elements, at least one of the plurality of polarizing elements may be the polarizing element according to the embodiment. For example, when the optical device according to the embodiment is a liquid crystal projector, at least one of the polarizing elements disposed on the light incident side and the light emission side of the liquid crystal panel may be the polarizing element according to the embodiment. From the viewpoint of further reducing deterioration of image quality due to ghost or the like, at least the polarizing element on the light emission side is desirably the polarizing element according to the embodiment and the polarizing elements on both of the light incident side and the light emission side are more desirably the polarizing element according to the embodiment.

According to the polarizing element 1, the polarizing element manufacturing method, and the optical device described above, the following effects are obtained.

Since the polarizing element 1 according to the embodiment includes the grid-shaped convex portion 11 formed by laminating the first absorption layer 13, the first dielectric layer 14, the reflection layer 15, the second dielectric layer 16, and the second absorption layer 17 in this order from the side of the transparent substrate 10, it is possible to suppress the absorption axis reflectance to be low for both of the light incident from the grid surface side and the light incident from the substrate surface side. Thus, even when the polarizing element 1 according to the embodiment is used as the polarizing element on the light emission side of the liquid crystal panel in the liquid crystal projector, it is possible to reduce deterioration of image quality due to ghost or the like.

Additionally, the invention is not limited to the above-described embodiment and modification and improvement within the scope of achieving the object of the invention are included in the invention.

Figure 2:
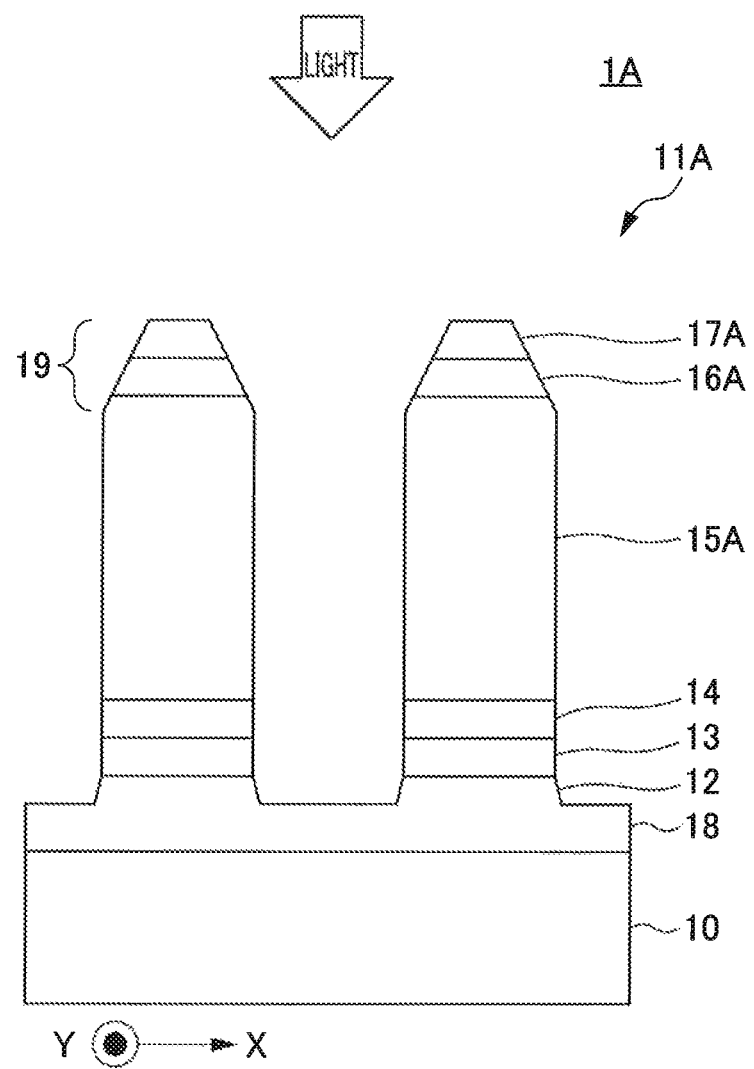
FIG. 2 is a schematic cross-sectional view illustrating an optical element according to Modified Example 1 of the embodiment.

FIG. 2 is a schematic cross-sectional view illustrating a polarizing element 1A according to Modified Example 1 of the embodiment. In the polarizing element 1A, a grid tip 19 formed at a tip of the grid-shaped convex portion 11A has a taper shape of which a side surface is inclined as a width is narrowed toward the tip when viewed from the extension direction of the grid-shaped convex portion 11A (the predetermined direction). More specifically, the grid tip 19 of the polarizing element 1A according to Modified Example 1 has an isosceles trapezoidal shape. The grid tip 19 is formed by a part of a reflection layer 15A, a second dielectric layer 16A, and a second absorption layer 17A.

When the grid tip 19 is formed in a taper shape as illustrated in FIG. 2, it is possible to improve the transmittance of the polarized light (TM wave) in the transmission axis direction (the X-axis direction). The reason why the transmittance of the TM wave increases in this way is as below. When the grid tip 19 is formed in a taper shape, there is an effect of suppressing the scattering of light incident with a variation in angle.

Additionally, in FIG. 2, a part of the reflection layer 15A is included in the grid tip 19, but the invention is not limited to this structure. For example, the grid tip 19 may be formed only by the second dielectric layer 16A and the second absorption layer 17A.

Figure 3:
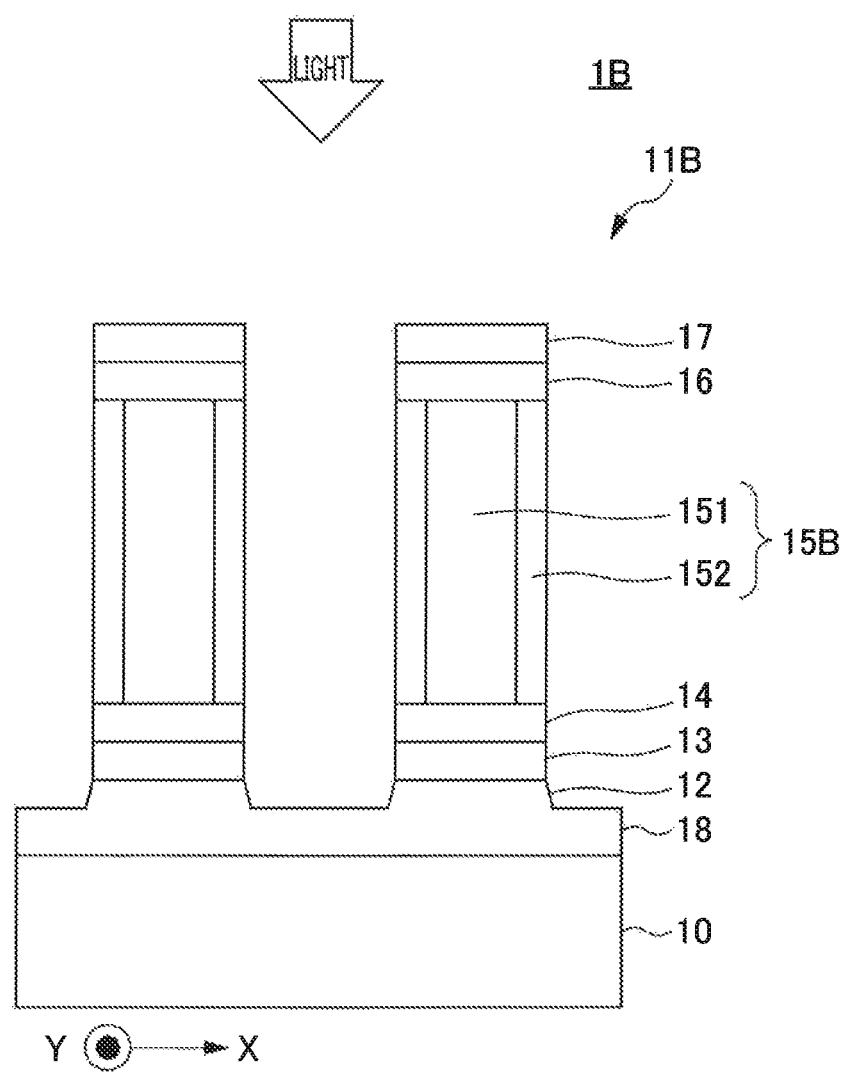
FIG. 3 is a schematic cross-sectional view illustrating an optical element according to Modified Example 2 of the embodiment.

FIG. 3 is a schematic cross-sectional view illustrating a polarizing element 1B according to Modified Example 2 of the embodiment. In the polarizing element 1B, the reflection layer 15B includes a metal layer 151 and an oxide layer 152 formed of metal oxide forming the metal layer 151 and covering a side surface of the metal layer 151 as viewed from the extension direction of the grid-shaped convex portion 11B (the predetermined direction).

The material forming the metal layer 151 is not particularly limited as long as the material is reflective to the light in the use band and, for example, an element such as Al, Ag, Cu, Mo, Cr, Ti, Ni, W, Fe, Si, Ge, and Te or an alloy including one or more elements thereof can be exemplified. Among these, the metal layer 151 is desirably formed of aluminum or an aluminum alloy.

The oxide layer 152 is formed of metal oxide forming the metal layer 151. For example, when the metal layer 151 is formed of Al, the oxide layer 152 is formed of $Al_2O_3$. The oxide layer 152 is formed by an oxidization reaction or the like according to the heat treatment of the metal layer.

When the reflection layer 15B is formed by the metal layer 151 and the oxide layer 152 as illustrated in FIG. 3, the area of the reflection layer 15B as viewed from the light incident direction is changed and the amount of light reflected by the reflection layer 15B is changed. Thus, it is possible to obtain the same light transmission characteristics as those of a case in which the grid width is narrowed without narrowing the grid width.

Additionally, also in the polarizing element 1B according to Modified Example 2, a grid tip may be formed at a tip of the grid-shaped convex portion 11B similarly to the polarizing element 1A according to Modified Example 1.

Figure 4:
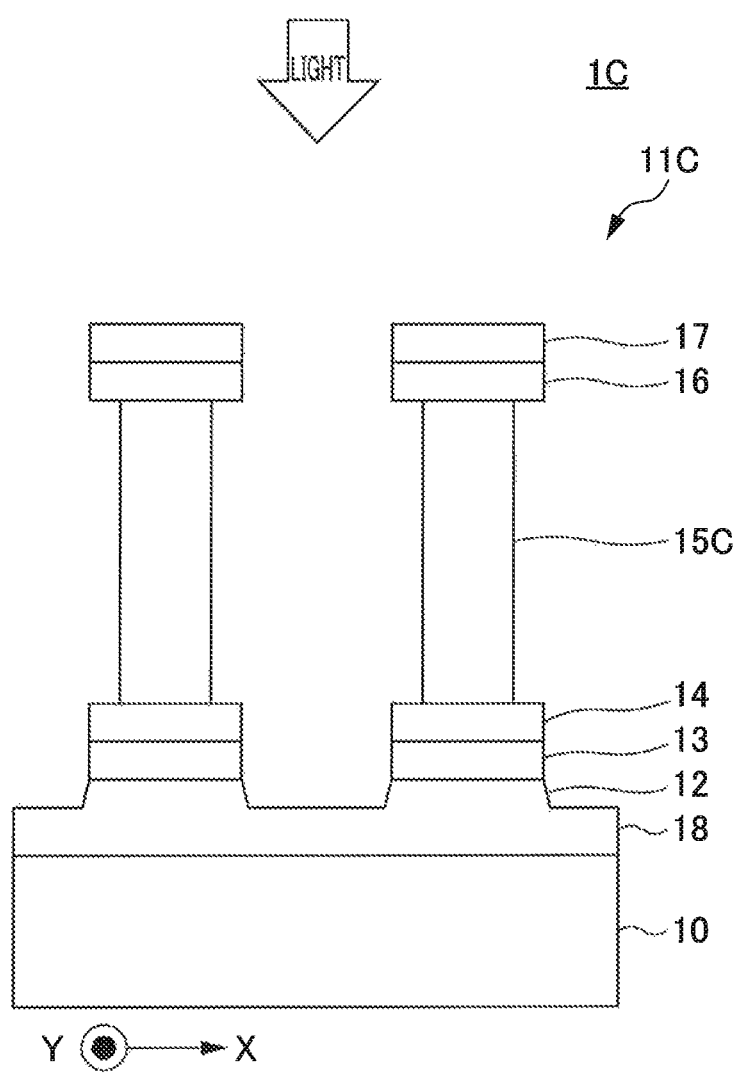
FIG. 4 is a schematic cross-sectional view illustrating an optical element according to Modified Example 3 of the embodiment.

FIG. 4 is a schematic cross-sectional view illustrating a polarizing element 1C according to Modified Example 3 of the embodiment. In a grid-shaped convex portion 11C of the polarizing element 1C, the width of the reflection layer 15C is smaller than those of the first dielectric layer 14 and the second dielectric layer 16.

When the width of the reflection layer 15C is set to be smaller than those of the first dielectric layer 14 and the second dielectric layer 16 as illustrated in FIG. 4, the area of the reflection layer 15C as viewed from the light incident direction is changed and the amount of light reflected by the reflection layer 15C is changed. Thus, it is possible to control the light transmission characteristics of the polarizing element 10 by controlling the width of the reflection layer 15C.

Additionally, also in the polarizing element 10 according to Modified Example 3, a grid tip may be formed at a tip of the grid-shaped convex portion 11C similarly to the polarizing element 1A according to Modified Example 1.

EXAMPLES

Next, examples of the invention will be described, but the invention is not limited to these examples.

Example 1 and Comparative Example 1

In Example 1, the polarizing element 1 having a structure illustrated in FIG. 1 was subjected to a simulation. Further, in Comparative Example 1, a polarizing element 100 having a structure illustrated in FIG. 5 was subjected to a simulation. More specifically, the optical characteristics of the polarizing elements were verified by electromagnetic field simulation according to a rigorous coupled wave analysis (RCWA) method. In the simulation, Grating simulator Gsolver manufactured from Grating Solver Development was used. Additionally, the polarizing element 1 of Example 1 and the polarizing element 100 of Comparative Example 1 are designed to be optimal to the light of the color band (wavelength λ=520 nm to 590 nm (predetermined wavelength)).

Figure 5:
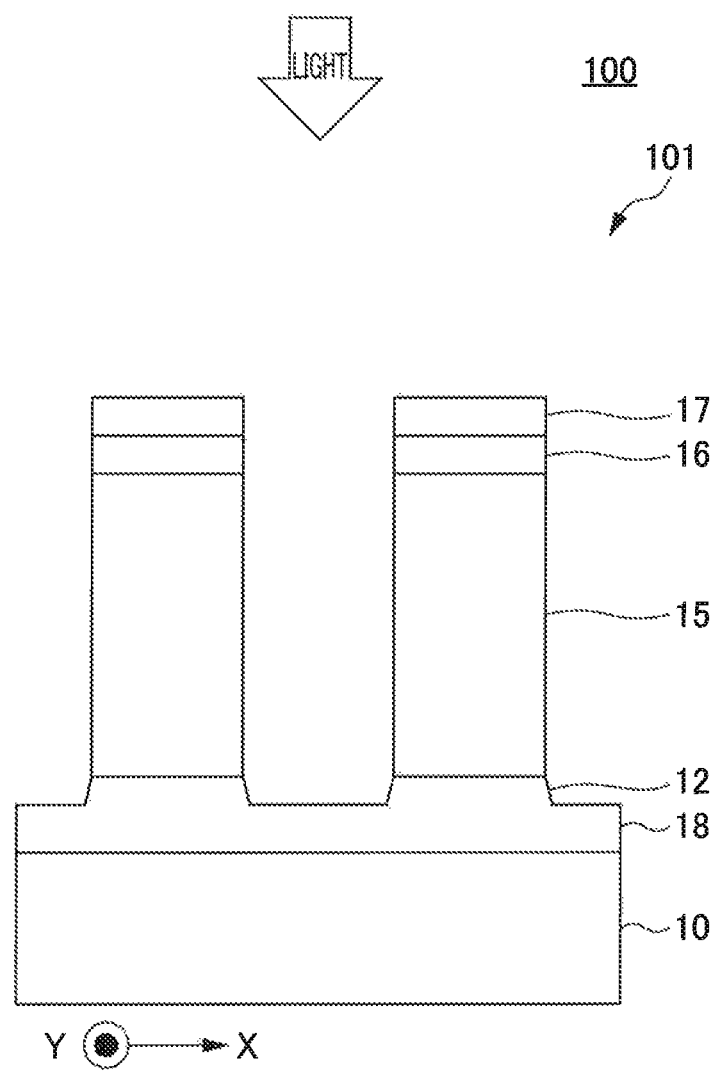
FIG. 5 is a schematic cross-sectional view illustrating an example of an optical element without a first absorption layer and a first dielectric layer.

FIG. 5 is a schematic cross-sectional view illustrating a structure of the polarizing element 100 of Comparative Example 1. In FIG. 5, the same reference numerals are given to the components which are common to the polarizing element 1 illustrated in FIG. 1. A grid-shaped convex portion 101 of the polarizing element 100 has the same configuration as that of the grid-shaped convex portion 11 of the polarizing element 1 illustrated in FIG. 1 except that the first absorption layer 13 and the first dielectric layer 14 are not provided.

Figure 6:
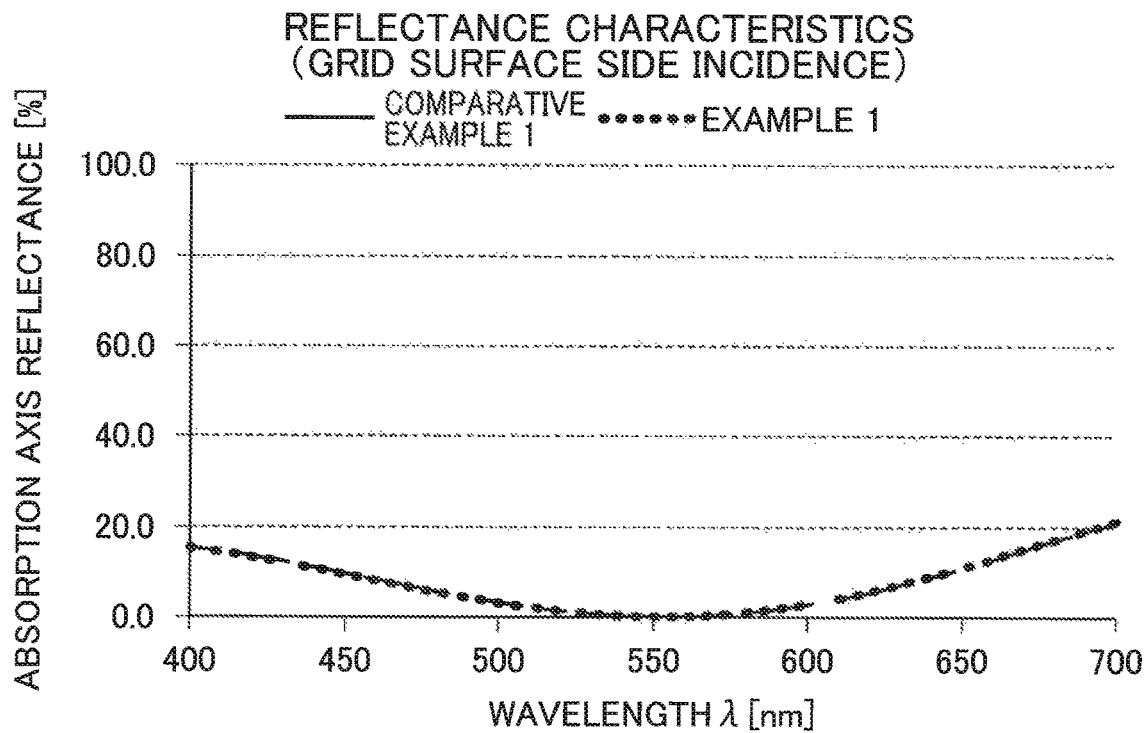
FIG. 6 is a graph showing a result obtained by verifying an absorption axis reflectance of light incident from a grid surface side in a polarizing element having a structure illustrated in FIG. 1 and a polarizing element having a structure illustrated in FIG. 5 by simulation.

FIG. 6 is a graph showing a result obtained by verifying the absorption axis reflectance of the light incident from the grid surface side in the polarizing element 1 having a structure illustrated in FIG. 1 and the polarizing element 100 having a structure illustrated in FIG. 5 by simulation. In FIG. 6, a horizontal axis indicates the wavelength λ (nm) and a vertical axis indicates the absorption axis reflectance (%). Here, the absorption axis reflectance means the reflectance of the polarized light (TE wave) incident to the polarizing element in the absorption axis direction (the Y-axis direction).

When light was incident from the grid surface side as shown in FIG. 6, the absorption axis reflectance was suppressed to be low by the functions of the second dielectric layer 16 and the second absorption layer 17 in any one of the structures of FIG. 1 and FIG. 5.

Figure 7:
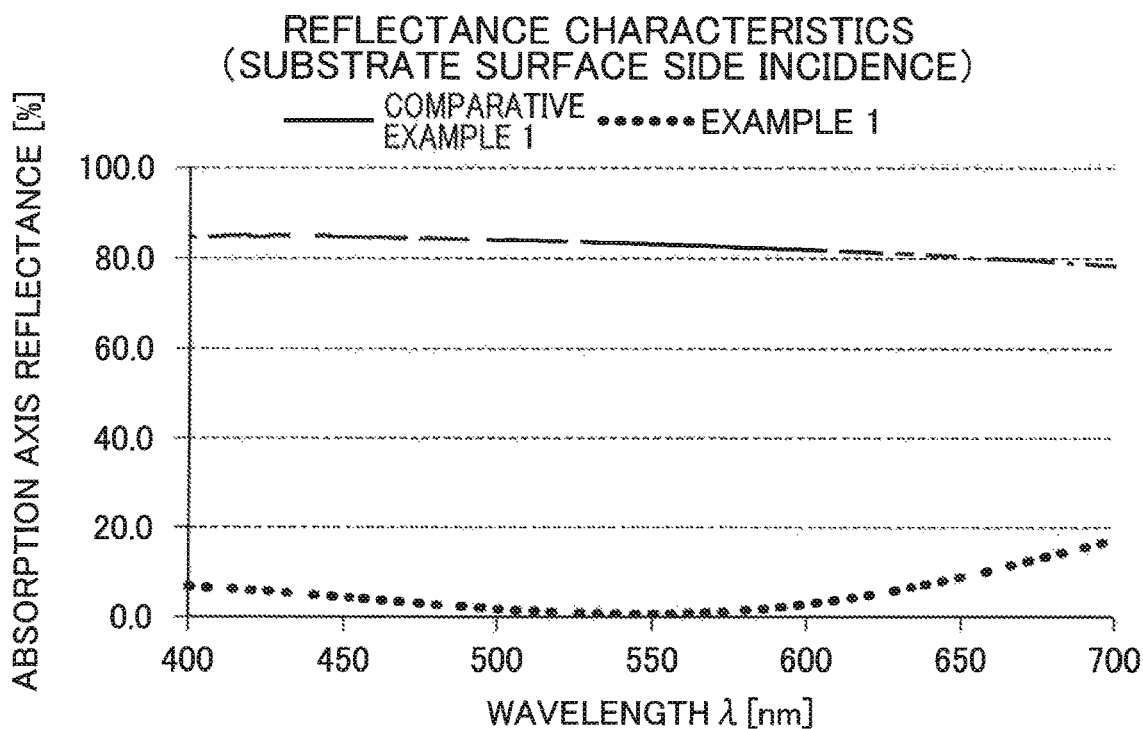
FIG. 7 is a graph showing a result obtained by verifying an absorption axis reflectance of light incident from a substrate surface side in the polarizing element having a structure illustrated in FIG. 1 and the polarizing element having a structure illustrated in FIG. 5 by simulation.

FIG. 7 is a graph showing a result obtained by verifying the absorption axis reflectance of the light incident from the substrate surface side in the polarizing element 1 having a structure illustrated in FIG. 1 and a polarizing element 100 having a structure illustrated in FIG. 5 by simulation. In FIG. 7, a horizontal axis indicates the wavelength λ (nm) and a vertical axis indicates the absorption axis reflectance (%).

When light was incident from the substrate surface side as shown in FIG. 7, the absorption axis reflectance was suppressed to be low by the functions of the first absorption layer 13 and the first dielectric layer 14 in the polarizing element 1 having a structure illustrated in FIG. 1. Meanwhile, since the polarizing element 100 having a structure illustrated in FIG. 5 did not include the first absorption layer 13 and the first dielectric layer 14, the absorption axis reflectance was remarkably increased.

Example 2

Figure 8:
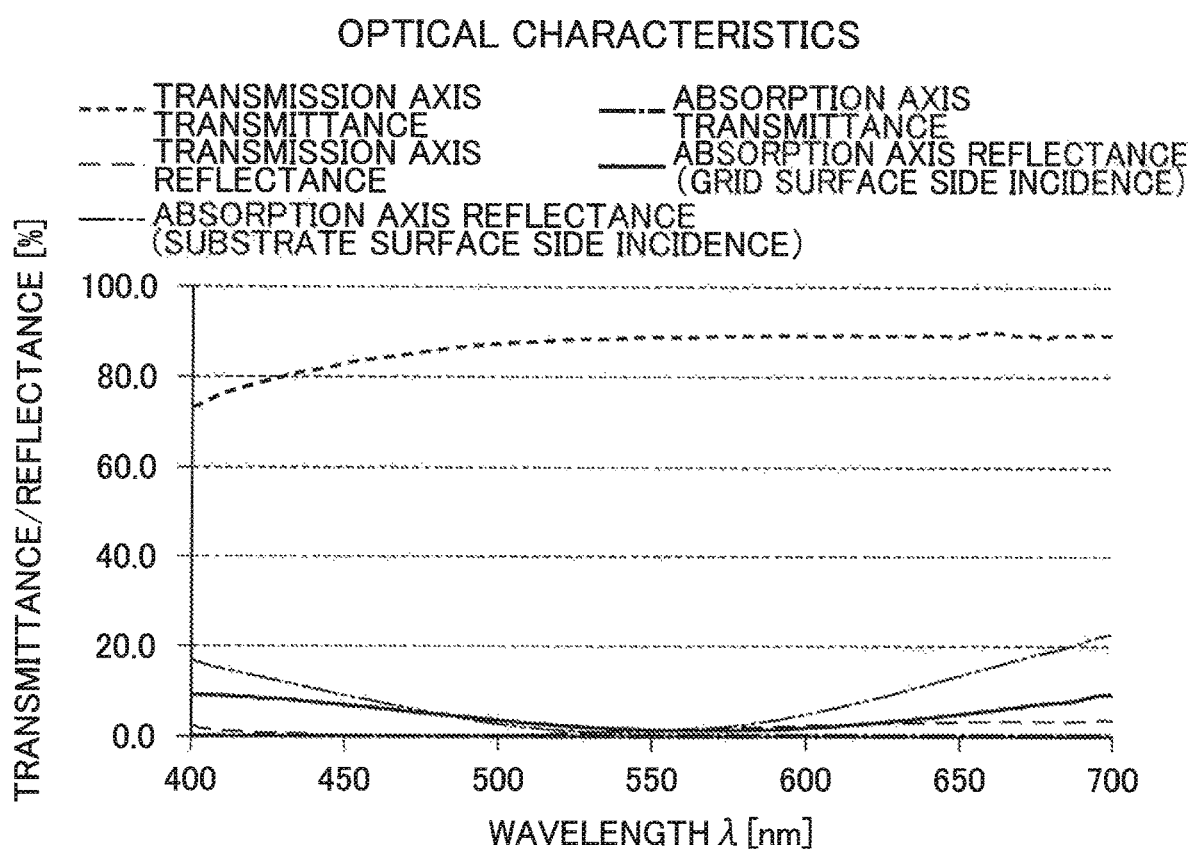
FIG. 8 is a graph showing a result obtained by verifying a transmission axis transmittance, an absorption axis transmittance, a transmission axis reflectance, and an absorption axis reflectance after the polarizing element having a structure illustrated in FIG. 1 is actually manufactured.

In Example 2, the polarizing element 1 having a structure illustrated in FIG. 1 was actually manufactured and the optical characteristics were verified. FIG. 8 is a graph showing a result obtained by verifying the transmission axis transmittance, the absorption axis transmittance, the transmission axis reflectance, and the absorption axis reflectance for the polarizing element 1 having a structure illustrated in FIG. 1. In FIG. 8, a horizontal axis indicates the wavelength λ (nm) and a vertical axis indicates the transmittance or reflectance (%). Here, the transmission axis transmittance means the transmittance of the polarized light (TM wave) incident to the polarizing element in the transmission axis direction (the X-axis direction) and the transmission axis reflectance means the reflectance of the polarized light (TM wave) incident to the polarizing element in the transmission axis direction (the X-axis direction). Further, the absorption axis transmittance means the transmittance of the polarized light (TE wave) incident to the polarizing element in the absorption axis direction (the Y-axis direction). Additionally, the absorption axis reflectance was verified for both of the light incident from the grid surface side and the light incident from the substrate surface side and the other optical characteristics were verified for the light incident from the grid surface side.

As shown in FIG. 8, in the polarizing element 1 having a structure illustrated in FIG. 1, it was possible to suppress the absorption axis reflectance to be low for both of the light incident from the grid surface side and the light incident from the substrate surface side and there was no bad influence on the other optical characteristics.

EXPLANATION OF REFERENCE NUMERALS 1, 1A, 1B, 1C: POLARIZING ELEMENT
10: TRANSPARENT SUBSTRATE
11, 11A, 11B, 11C: GRID-SHAPED CONVEX PORTION
12: BASE
13: FIRST ABSORPTION LAYER
14: FIRST DIELECTRIC LAYER
15, 15A, 15B, 15C: REFLECTION LAYER
16, 16A: SECOND DIELECTRIC LAYER
17, 17A: SECOND ABSORPTION LAYER
18: UNDERLYING LAYER
19: GRID TIP
100: POLARIZING ELEMENT
101: GRID-SHAPED CONVEX PORTION
151: METAL LAYER
152: OXIDE LAYER

What is claimed is:

1. A polarizing element having a wire grid structure, comprising:
a transparent substrate; and
grid-shaped convex portions arranged on the transparent substrate at a pitch shorter than a wavelength of light in a use band and extending in a predetermined direction,
wherein the grid-shaped convex portion has a first structure in which a first absorption layer, a first dielectric layer, a reflection layer, a second dielectric layer, and a second absorption layer are continuous with each other in this order from the transparent substrate side, or a second structure in which a first absorption layer, a first diffusion barrier layer constituted by a first metal film, a first dielectric layer, a reflection layer, a second dielectric layer, a second diffusion barrier layer constituted by a second metal film, and a second absorption layer are continuous with each other in this order from the transparent substrate side, wherein the grid-shaped convex portion includes a base between the transparent substrate and the first absorption layer, the base having a trapezoidal shape as viewed in the predetermined direction, and wherein a film thickness of the first absorption layer is substantially the same as a film thickness of the second absorption layer and a film thickness of the first dielectric layer is substantially the same as a film thickness of the second dielectric layer.

2. The polarizing element according to claim 1, wherein the base is formed of Si oxide which is transparent to the wavelength of the light in the use band.

3. The polarizing element according to claim 1, wherein the first absorption layer and the second absorption layer are formed of the same material.

4. The polarizing element according to claim 1, wherein the first dielectric layer and the second dielectric layer are formed of the same material.

5. The polarizing element according to claim 1, wherein the transparent substrate is transparent to the wavelength of the light in the use band and is formed of glass, quartz, or sapphire.

6. The polarizing element according to claim 1, wherein the reflection layer is formed of aluminum or an aluminum alloy.

7. The polarizing element according to claim 1, wherein the first dielectric layer and the second dielectric layer are formed of Si oxide.

8. The polarizing element according to claim 1, wherein the first absorption layer and the second absorption layer include Fe or Ta and further include Si.

9. The polarizing element according to claim 1, wherein a surface on the side of the grid-shaped convex portion of the polarizing element is covered with a protection film formed of a dielectric material.

10. The polarizing element according to claim 1, wherein a surface on the side of the grid-shaped convex portion of the polarizing element is covered with an organic water repellent film.

11. The polarizing element according to claim 1, wherein a grid tip formed at a tip of the grid-shaped convex portion has a taper shape of which a side surface is inclined so that a width is narrowed toward the tip as viewed from the predetermined direction.

12. The polarizing element according to claim 1, wherein the reflection layer includes a metal layer and an oxide layer formed of metal oxide forming the metal layer and covering a side surface of the metal layer as viewed from the predetermined direction.

13. The polarizing element according to claim 1, wherein a width of the reflection layer is smaller than those of the first dielectric layer and the second dielectric layer.

14. A method of manufacturing a polarizing element having a wire grid structure, comprising:

forming, on a transparent substrate, a first lamination structure in which an underlying layer, a first absorption layer, a first dielectric layer, a reflection layer, a second dielectric layer, and a second absorption layer are continuous with each other in this order from the transparent substrate side, or a second lamination structure in which an underlying layer, a first absorption layer, a first diffusion barrier layer constituted by a first metal film, a first dielectric layer, a reflection layer, a second dielectric layer, a second diffusion barrier layer constituted by a second metal film, and a second absorption layer are continuous with each other in this order from the transparent substrate side; and forming grid-shaped convex portions arranged on the transparent substrate at a pitch shorter than a wavelength of light in a use band and extending in a predetermined direction by selectively etching the first lamination structure or the second lamination structure, wherein the grid-shaped convex portion includes a base between the transparent substrate and the first absorption layer, the base having a trapezoidal shape as viewed in the predetermined direction, and wherein a film thickness of the first absorption layer is substantially the same as a film thickness of the second absorption layer and a film thickness of the first dielectric layer is substantially the same as a film thickness of the second dielectric layer.

15. An optical device comprising the polarizing element according to claim 1.

* * * * *